(12) United States Patent
Lee et al.

(10) Patent No.: US 10,900,440 B2
(45) Date of Patent: Jan. 26, 2021

(54) FLOW CONTROL VALVE AND COOLING CIRCUIT FOR VEHICLES WITH FLOW CONTROL VALVE

(71) Applicants: Hyundai Motor Company, Seoul (KR); Kia Motors Corp., Seoul (KR)

(72) Inventors: Phil Gi Lee, Suwon-si (KR); Jae Suk Park, Suwon-si (KR); Seong Soo Kim, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 220 days.

(21) Appl. No.: 16/105,732

(22) Filed: Aug. 20, 2018

(65) Prior Publication Data

US 2019/0186408 A1 Jun. 20, 2019

(30) Foreign Application Priority Data

Dec. 19, 2017 (KR) .................. 10-2017-0174860

(51) Int. Cl.
*F01P 7/02* (2006.01)
*F02F 1/14* (2006.01)
*F02F 1/36* (2006.01)
*F02M 26/13* (2016.01)

(52) U.S. Cl.
CPC ............... *F02F 1/14* (2013.01); *F02F 1/36* (2013.01); *F02M 26/13* (2016.02)

(58) Field of Classification Search
CPC .... F01P 2007/146; F01P 7/165; F02M 21/023
USPC ................................................. 123/41.04
See application file for complete search history.

(56) References Cited

U.S. PATENT DOCUMENTS

| 4,111,393 A * | 9/1978 | McClurg ............... F16K 5/0673 251/174 |
| 4,312,304 A * | 1/1982 | Tyner ....................... F01P 3/02 123/41.31 |
| 5,048,467 A * | 9/1991 | Kojima ................... F01P 3/202 123/41.74 |
| 5,937,802 A * | 8/1999 | Bethel ....................... F01P 3/02 123/41.08 |
| 9,758,017 B2 * | 9/2017 | Michikawauchi ........................ B60H 1/00885 |
| 10,036,302 B2 * | 7/2018 | Watanabe ............... F02D 41/04 |
| 10,047,662 B2 * | 8/2018 | Takahashi ................ F01P 3/20 |
| 10,227,910 B2 * | 3/2019 | Kaneko ..................... F01P 5/10 |

(Continued)

FOREIGN PATENT DOCUMENTS

JP         2004-137981 A         5/2004

*Primary Examiner* — Long T Tran
*Assistant Examiner* — James J Kim
(74) *Attorney, Agent, or Firm* — Morgan, Lewis & Bockius LLP

(57) ABSTRACT

A cooling circuit for a vehicle may include a plurality of cylinder heads into which cooling water is continuously introduced from a plurality of cylinder blocks oppositely disposed parallel with each other, wherein a flow control valve may include a head port, through which the cooling water discharged from the plurality of cylinder heads is joined and the joined cooling water is introduced into the flow control valve, and wherein the flow control valve also may include a set of ports including a radiator port, a heat exchanger port, and a heater core port, through which the cooling water introduced into the flow control valve is discharged towards a radiator, an oil heat exchanger, and a heater core, respectively.

2 Claims, 8 Drawing Sheets

(56) References Cited

U.S. PATENT DOCUMENTS

| | | | | |
|---|---|---|---|---|
| 10,280,829 B2 | * | 5/2019 | Shen | F16K 31/043 |
| 2005/0034688 A1 | * | 2/2005 | Lelkes | F16K 11/074 |
| | | | | 123/41.01 |
| 2016/0109031 A1 | * | 4/2016 | Greene | F16K 11/0876 |
| | | | | 251/314 |
| 2016/0201549 A1 | * | 7/2016 | Kim | F01P 7/165 |
| | | | | 123/41.1 |
| 2017/0314454 A1 | * | 11/2017 | Sakamoto | F01P 3/02 |

* cited by examiner

FLOW CONTROL VALVE AND COOLING CIRCUIT FOR VEHICLES WITH FLOW CONTROL VALVE

CROSS REFERENCE TO RELATED APPLICATION(S)

The present application claims priority to Korean Patent Application No. 10-2017-0174860, filed on Dec. 19, 2017, the entire contents of which is incorporated herein for all purposes by this reference.

BACKGROUND OF THE INVENTION

Field of the Invention

The present invention relates generally to a flow control valve and a cooling circuit for a vehicle, wherein the cooling circuit has an optimized flow control valve in an engine having a complex cooling circuit, such as a V-type engine.

Description of Related Art

Generally, a vehicle has poor fuel efficiency at its initial cold start condition, compared to at its sufficiently warmed-up condition. This is because friction in an engine is great due to high viscosity of low temperature oil during cold operation, and heat loss through cold temperature cylinder wall is great, whereby combustion stability becomes degraded.

Thus, it is required to rapidly elevate temperature of an engine at initial start condition to improve fuel efficiency and engine durability of a vehicle.

Heat control of an engine refers to the technique to maximally use heat generated by the engine in warm-up of the engine, having effects of improving fuel efficiency and output power, and reducing emissions. Representative techniques include a flow-stop valve, a clutch-type water pump, an electric water pump, an integrated flow control valve, or the like.

Among them, the flow-stop valve is disposed on an engine outlet or an engine inlet to stop flowing of a coolant of an engine during warming-up of the engine to shorten warming-up time. Similarly, the clutch-type water pump and the electric water pump are controlled to implement rapid warming-up of an engine.

The integrated flow control valve variably controls a flow rate, as well as simply stops a coolant in an engine, to first supply an elevated coolant to an oil warmer or ATF warmer to rapidly elevate temperatures of engine oil, transmission oil, and the entire of the engine, obtaining optimum, rapid warming-up of the engine.

However, in the case of a vehicle having a V-type engine, a cooling line is complicated, making it difficult to apply the integrated flow control valve thereto, and thus there is a demand for a cooling circuit capable of applying the integrated flow control valve to the V-type engine.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a flow control valve and a cooling circuit for a vehicle, wherein an optimized flow control valve is provided in an engine such as a V-type engine having a complex cooling circuit.

In various aspects of the present invention, there is provided a cooling circuit for a vehicle, the cooling circuit including: a plurality of cylinder heads into which cooling water is continuously introduced from a plurality of cylinder blocks oppositely disposed parallel with each other; and a flow control valve having a head port, through which the cooling water discharged from the plurality of cylinder heads is joined and the joined cooling water is introduced into the flow control valve, and having a set of ports including a radiator port, a heat exchanger port, and a heater core port, through which the cooling water introduced into the flow control valve is discharged towards a radiator, an oil heat exchanger, and a heater core, respectively.

A cooling path may be connected to the flow control valve to allow cooling water from water jackets of the cylinder blocks oppositely disposed parallel with each other to be joined together.

An exhaust gas recirculation (EGR) cooling path may be connected to the flow control valve to allow cooling water discharged from the cylinder block to be continuously introduced into an exhaust gas recirculation (EGR) cooler.

In an aspect, a flow control valve may include: a head port, through which cooling water discharged from a plurality of cylinder heads oppositely disposed parallel with each other into a plurality of cylinder heads is joined and the joined cooling water is continuously introduced into the flow control valve; and a set of ports including a radiator port, a heat exchanger port, and a heater core port, through which the cooling water introduced through the head port is discharged towards a radiator, an oil heat exchanger, and a heater core, respectively.

The flow control valve may include: a valve housing having a head port, a radiator port, a heat exchanger port, and a heater core port; a driving device providing driving power; and a valve body rotatable within a specified rotation angle range in the valve housing by the driving power from the driving device to selectively open the radiator port, the heat exchanger port, and the heater core port as a rotation angle varies, controlling a flow of cooling water.

Here, the flow control valve may be configured such that in a second rotation section in the rotation angle range of the valve body, all of the radiator port, the heat exchanger port, and the heater core port are closed.

Furthermore, the flow control valve may be configured such that in a first rotation section of the valve body continuing from an initial point of a zero rotation angle to the second rotation section, only the heater core port is opened.

Here, an opening ratio of the heater core port may have a maximum value from the initial point to a middle portion of the first rotation section.

Furthermore, the flow control valve may be configured such that as the valve body rotates from the second rotation section towards a final point of a maximum rotation angle, the heat exchanger port, the heater core port, and the radiator port are sequentially opened.

Furthermore, in a third rotation section of the valve body continuing from the second rotation section toward the final point, only the heat exchanger port may be opened.

Here, the heat exchanger port may start opening at a boundary between the second rotation section and the third rotation section and gradually increase the opening ratio to a maximum value before a boundary between the third rotation section and a fourth rotation section continuing from the third rotation section toward the final point.

Furthermore, the flow control valve may be configured such that in the fourth rotation section of the valve body continuing from the third rotation section toward the final point, the heat exchanger port and the heater core port are opened.

Here, the heater core port may start opening at a boundary between the third rotation section and the fourth rotation section and gradually increase the opening ratio to a maximum value before a boundary between the fourth rotation section and a fifth rotation section continuing from the fourth rotation section toward the final point.

Furthermore, the flow control valve may be configured such that in the fifth rotation section continuing from the fourth rotation section to the final point, all of the heat exchanger port, the heater core port, and the radiator port are opened.

Here, the radiator port may start opening at a boundary between the fourth rotation section and the fifth rotation section and gradually increase the opening ratio to a maximum value from a middle portion to the final point of the fifth rotation section.

Furthermore, a plurality of sealing devices may be provided between inlets and outlets of respective ports facing an external surface of the valve body.

The sealing device may include an elastic valve ring coming into close contact with an edge portion of the inlet or outlet of the port; a ring type gasket coming into close contact with the external surface of the valve body; and a gasket support provided between the valve ring and the gasket such that the gasket support comes into close contact with and covers one side of the gasket to support the gasket.

According to an exemplary embodiment of the present invention, in the V-type engine, the cooling water is introduced into the flow control valve after being joined together at a front side of the flow control valve, simplifying a cooling line between the cylinder head and the flow control valve, and having an effect of optimally adapting the flow control valve to the cooling circuit of the V-type engine.

Furthermore, with a single operation of the flow control valve, the three ports are variably controlled, implementing variable temperature control elevating the entire of an engine, and rapid warming up of the engine, maximizing fuel efficiency improvement.

Furthermore, various control stages are provided in the flow control valve according to an operating condition of a vehicle, and the operation is controlled through sequential control stages, having an effect of reducing operating distance and times of the flow control valve, Furthermore, setting of the heating-first stage enables a flow rate toward the heater core to be maximized, eliminating unnecessary flow loss of cooling water and maximizing the fuel efficiency and heating performance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
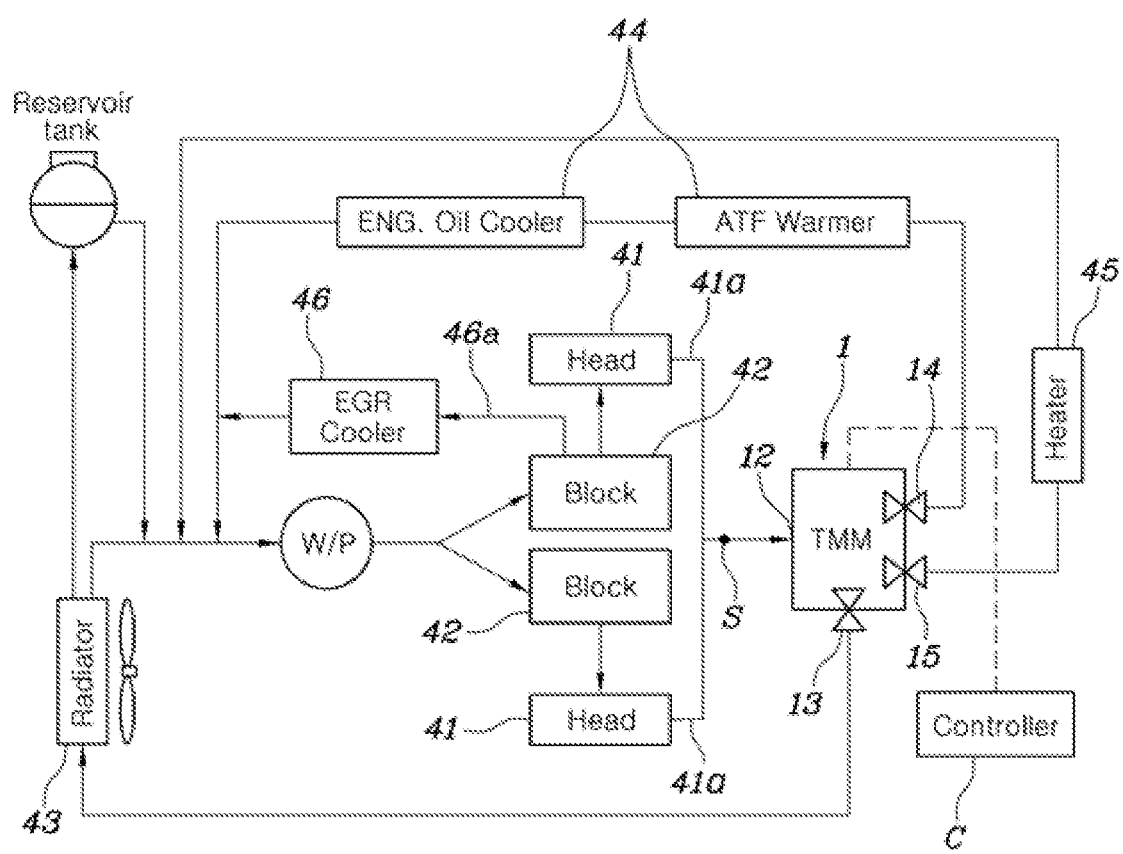
FIG. 1 is a schematic view illustrating the configuration of a cooling circuit for a vehicle, wherein a flow control valve according to an exemplary embodiment of the present invention is disposed in the cooling circuit.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings.

FIG. 1 is a schematic view illustrating the configuration of a cooling circuit for a vehicle, wherein a flow control valve 1 according to an exemplary embodiment of the present invention is disposed in the cooling circuit.

Specifically, in a V-type engine, cooling water is discharged from a plurality of cylinder blocks 42, which are oppositely disposed parallel with each other, and the discharged cooling water is continuously introduced into respective cylinder heads 41.

The flow control valve 1 has a head port 12, which is connected to cooling water outlets of the cylinder heads, and through which the cooling water is introduced into the flow control valve 1 from the cylinder heads 41.

Figure 2:
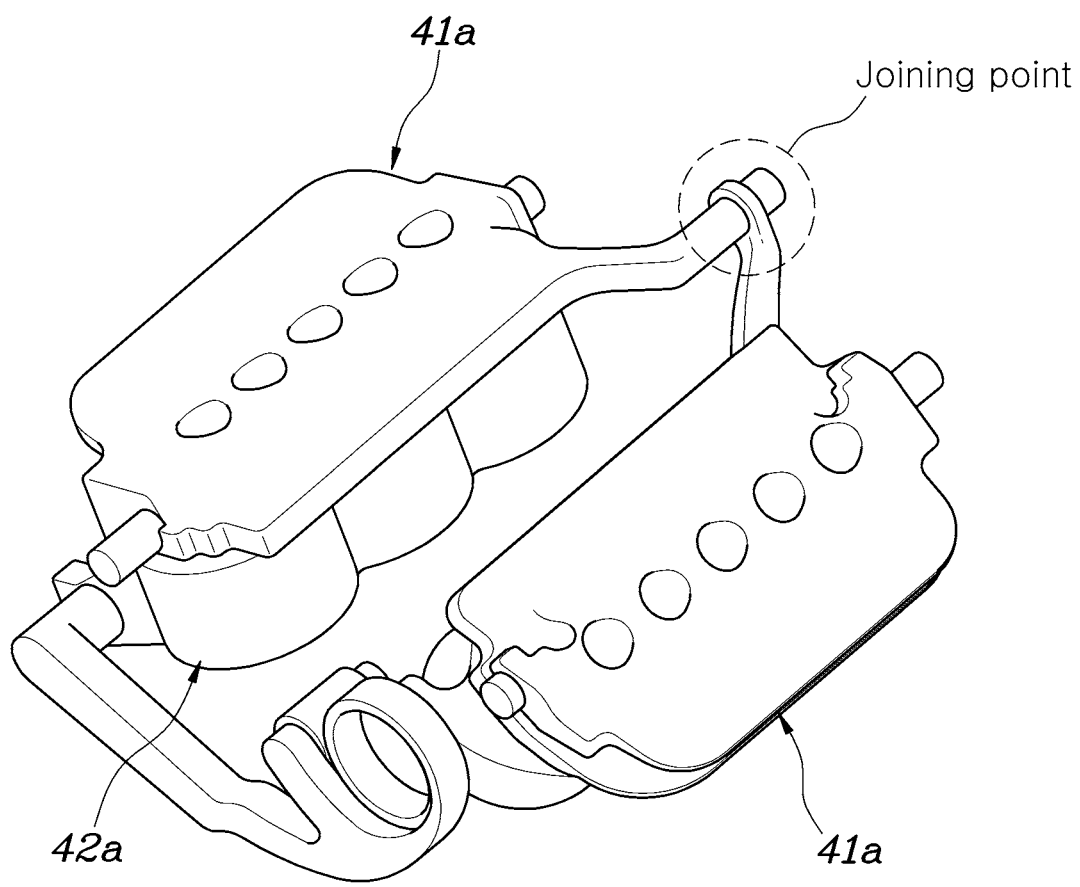
FIG. 2 is a view illustrating a water jacket configuration of a cylinder block and a cylinder head according to an exemplary embodiment of the present invention.
Figure 3:
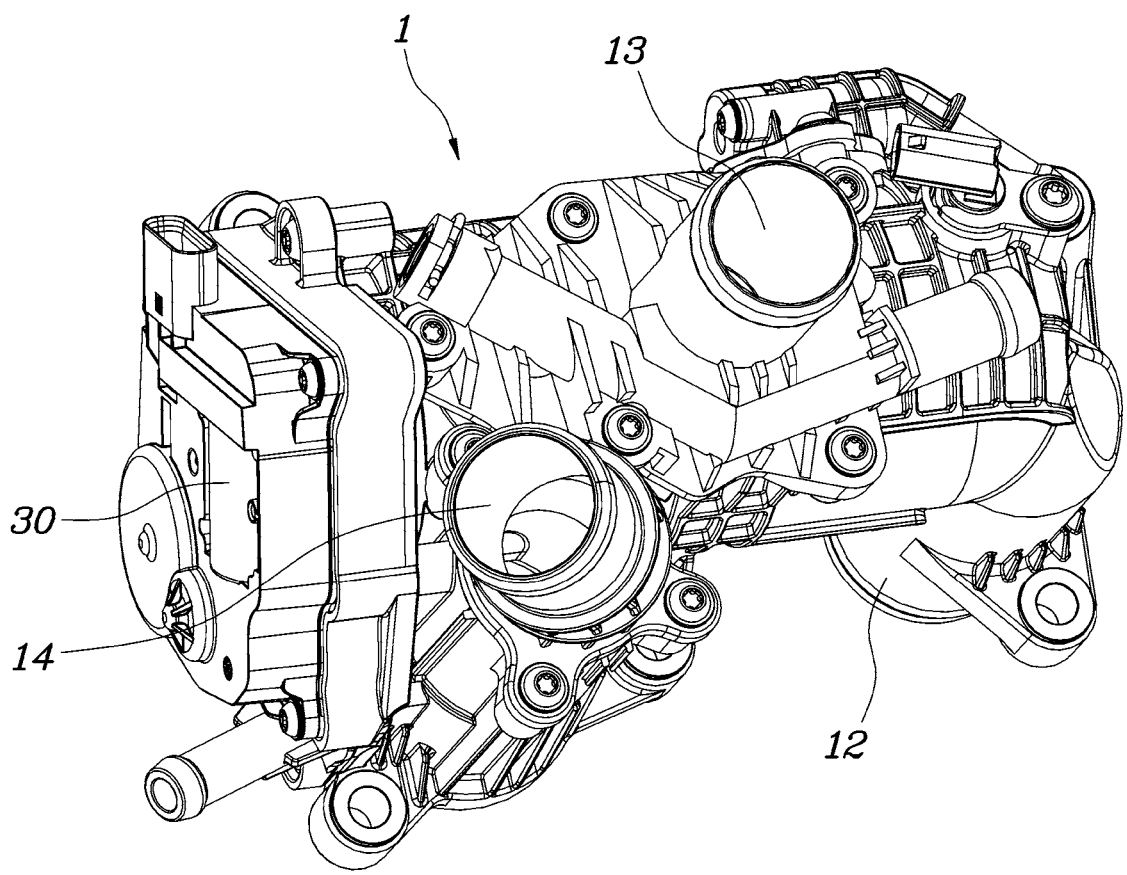
FIG. 3, FIG. 4, and FIG. 5 are views illustrating the appearance of the flow control valve.
Figure 4:
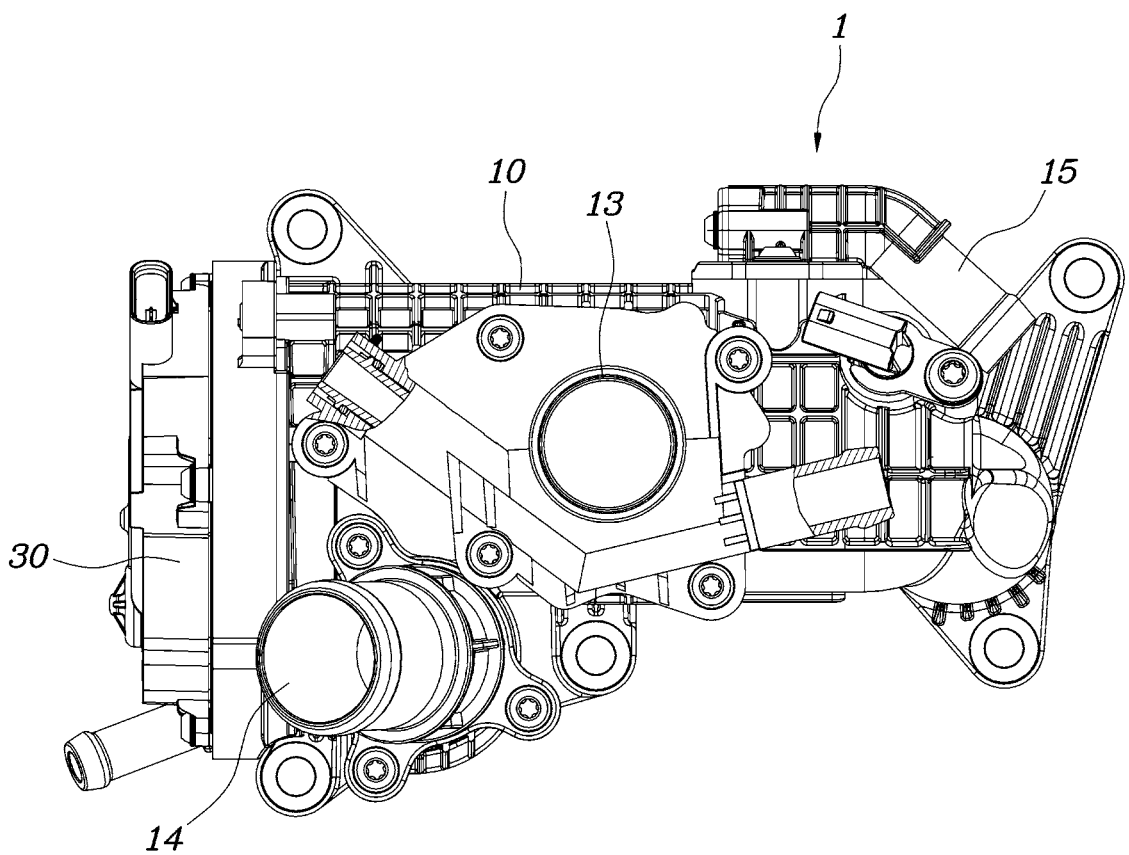
Figure 5:
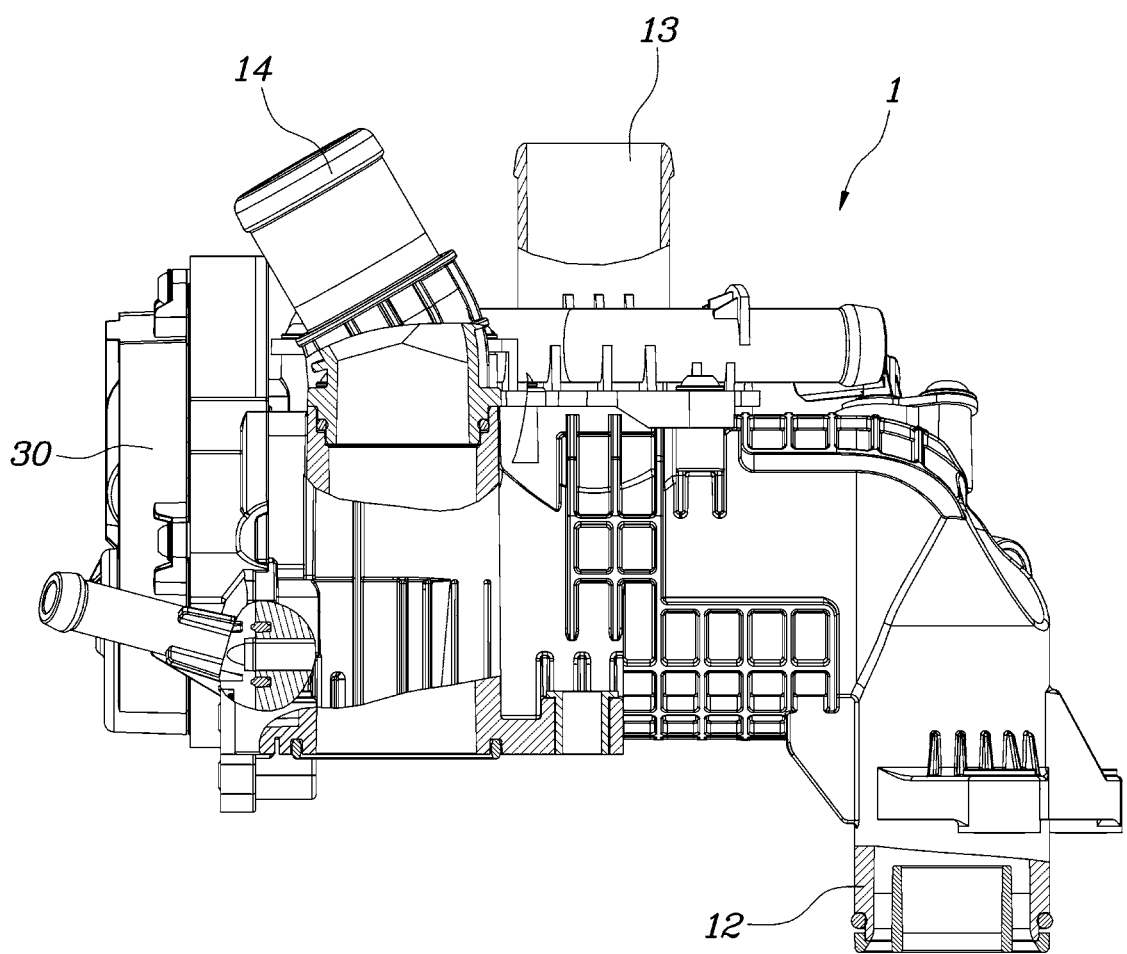
Figure 6:
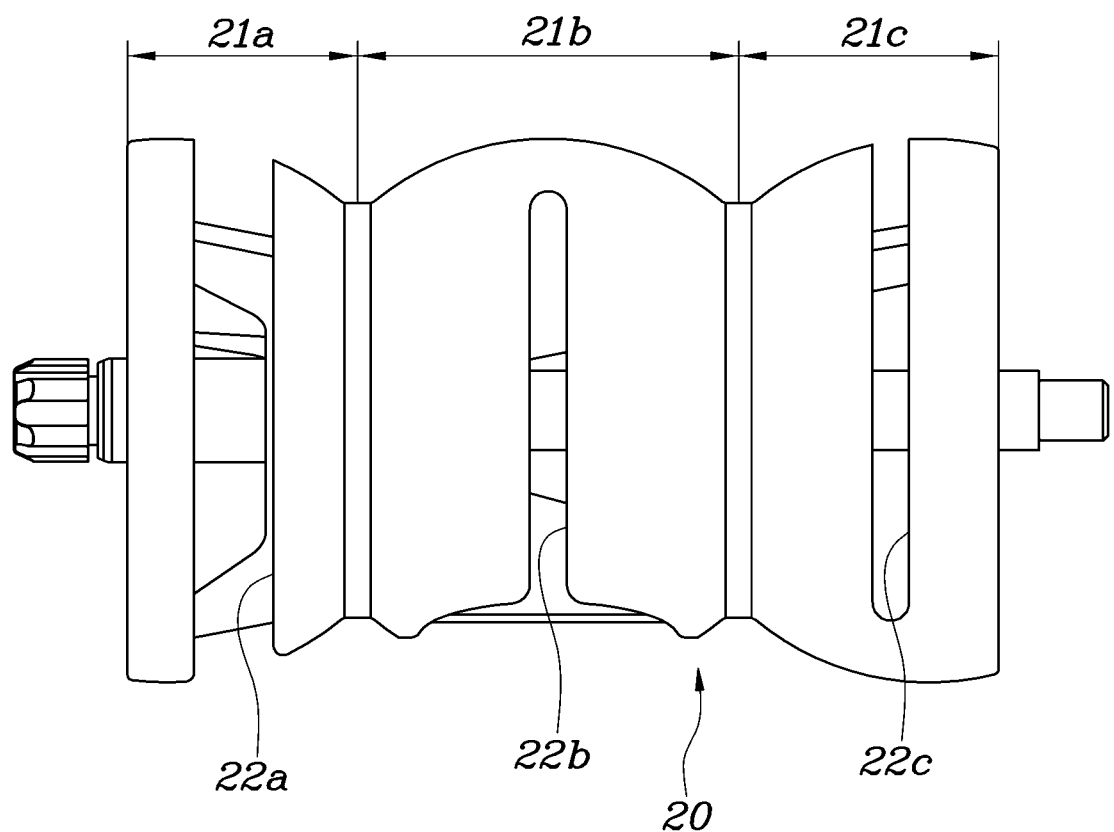
FIG. 6 is a view illustrating the shape of a valve body provided in the flow control valve.

The cooling water discharged from respective cylinder heads 41 is joined together at a front side of the head port 12 and the joined cooling water is introduced into the head port 12. As illustrated in FIG. 2, the cooling water stored in water jackets 42a of the cylinder blocks 42 is introduced into water jackets 41a of the cylinder heads 41, wherein the water jackets 41a of the cylinder heads have a channel at which the cooling water is joined. Thus, the cooling water may be joined together at the front side of the head port 12 without a separate component for joining cooling water together.

The flow control valve 1 may have three outlet ports, which are connected to a radiator 43, a heat exchanger 44, such as an oil cooler, an oil warmer, or the like, and a heater core 45, so that the cooling water discharged from the flow control valve 1 is introduced thereinto.

Here, the outlet ports may be a radiator port 13, a heat exchanger port 14, and a heater core port 15, which will be described later. Reference sign S denotes a temperature sensor for cooling water, and reference sign W/P may be a water pump.

According to the above-mentioned configuration, in the V-type engine in which a plurality of cylinders is oppositely disposed parallel with each other, the cooling water is introduced into the flow control valve 1 after being joined together at a front side of the flow control valve, simplifying a cooling line between the cylinder head 41 and the flow control valve 1, having an effect of optimally adapting the flow control valve 1 to the cooling circuit of the V-type engine.

Furthermore, an exhaust gas recirculation (EGR) cooling path 46a may be provided to allow cooling water discharged from the cylinder block 42 to be continuously introduced into an exhaust gas recirculation (EGR) cooler 46.

For example, the EGR cooler 46 is disposed on the EGR cooling path 46a, wherein a first end portion of the EGR cooling path 46a is connected to the EGR cooler 46 through water jackets of the cylinder block 42, and a second end portion of the EGR cooling path 46a is connected to a front side of the water pump W/P through water jackets of the cylinder block 42.

That is, since the EGR cooling path 46a is connected to the cylinder block 42, the cooling water absorbing heat of an engine body may be continuously supplied to the EGR cooler 46.

The flow control valve 1 includes the head port 12, through which cooling water discharged from the plurality of cylinder heads 42 oppositely disposed parallel with each other is joined and the joined cooling water is introduced into the flow control valve. The flow control valve also includes a radiator port 13, a heat exchanger port 14, and a heater core port 15, through which the cooling water introduced into the flow control valve 1 is discharged towards a radiator 43, an oil heat exchanger 44, and a heater core 45, respectively.

The flow control valve 1 may include a valve housing 10, a driving device 30, and a valve body 20. Referring to FIG. 3, FIG. 4, FIG. 5 and FIG. 6, the valve housing 10 is provided with the head port 12, through which cooling water discharged from the cylinder heads 41 of an engine is introduced into the valve housing. The valve housing also has the radiator port 13, the heat exchanger port 14, and the heater core port 15, through which the cooling water introduced into the valve housing 10 is discharged.

The head port 12 may be provided on an end side of the valve housing 10 as a pipe, which is connected to the cooling water outlet of the cylinder head 41.

The radiator port 13 may be provided on a lateral side of the valve housing 10 as a pipe, which is connected to a path on which the radiator 43 is disposed.

The heat exchanger port 14 may be provided on a lateral side of the valve housing 10 as a pipe, which is connected to a path on which the heat exchanger 44, such as an oil cooler, an oil warmer, or the like, is disposed. The heater core port 15 may be provided on a lateral side of the valve housing 10 as a pipe, which is connected to a path on which the heater core 45 is disposed.

The driving device 30 is a device which is attached to an upper portion of the valve housing 10 to provide driving power. The driving device may preferably be a motor.

The valve body 20 is a hollow barrel-type body having an axial rotation shaft, to which driving power from the driving device 30 is applied so that the valve body rotates within a specified angle range in the valve housing 10. Here, the driving device 30 may be driven in a response to a signal from a controller C.

The valve body 20 may circumferentially have flow control openings on the lateral side of the valve body 20 such that the flow control openings selectively communicate with the radiator port 13, the heat exchanger port 14, and the heater core port 15 as a rotation angle of the valve body changes.

For example, the valve body 20 may axially include first, second, and third body sections 21a, 21b, and 21c having first, second, and third flow control openings 22a, 22b, and 22c, respectively, wherein inlets of the radiator port 13, the heat exchanger port 14, and the heater core port 15 may be provided at positions corresponding to those of the first, second, and third flow control openings, respectively.

That is, as the valve body 20 rotates, when the flow control openings overlap and communicate with inlets of the corresponding ports, the cooling water flows therethrough, and on the contrary, when the flow control openings do not overlap and communicate with inlets of the corresponding ports, the cooling water cannot flow therethrough.

However, since an outlet of the head port 12 is designed to continuously communicate with the internal space of the valve housing 10, the cooling water discharged from the cylinder head 41 may be continuously introduced into the valve body 20.

Figure 7:
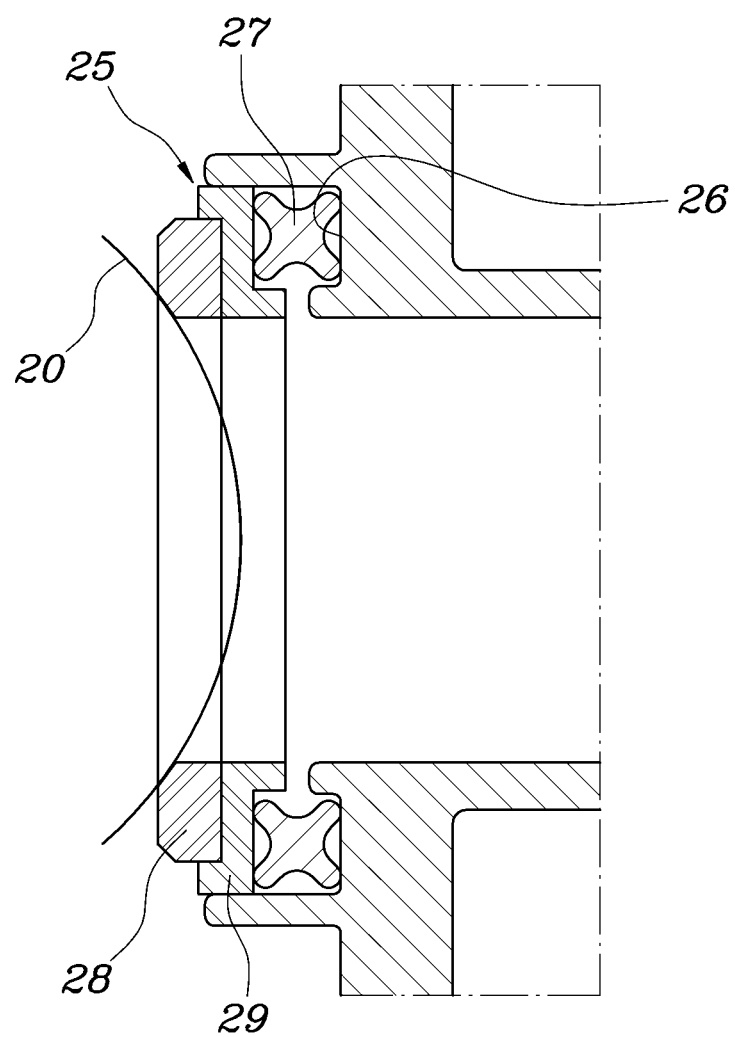
FIG. 7 is a view illustrating a coupling structure of a sealing device according to an exemplary embodiment of the present invention.

Furthermore, as illustrated in FIG. 7, sealing devices 25 may be provided between inlets and outlets of respective ports facing an external surface of the valve body 20.

Referring to FIG. 7, together with FIG. 3, FIG. 4, FIG. 5 and FIG. 6, the sealing devices 25 may be provided between the inlet of the radiator port 13 and the external surface of the valve body 20 opposite to the inlet, between the inlet of the heat exchanger port 14 and the external surface of the valve body 20 opposite to the inlet, and the inlet of the heater core port 15 and the external surface of the valve body 20 opposite to the inlet, respectively.

That is, the sealing devices 25 are provided on the inlets of the ports formed internal to the valve housing 10 such that they come into direct contact with the valve body 20, forming surface-contact pressure and airtightness and thus preventing leakage of the cooling water flowing through respective ports.

The sealing device 25 may include a valve ring 27, a gasket 28, and a gasket support 29. The valve ring 27 is formed from an elastic material such as rubber, and may be closely fitted around an edge portion of the inlet or outlet of the port.

Figure 8:
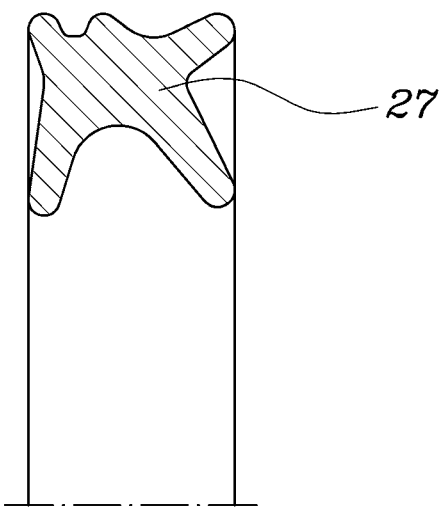
FIG. 8 is a view illustrating another exemplary embodiment of a valve ring of the sealing device.

For example, the inlet or outlet of the port is provided on the edge portion thereof with a ring groove 26, in which the valve ring 27 is fitted. The valve ring 27 may have a cross section in a form of 'X' shown in FIG. 7, or 'K.' shown in FIG. 8.

The gasket 28 may be provided in a form of a ring, one side of which may come into close contact with the external surface of the valve body 20.

For example, an internal circumferential edge portion on one side of the gasket 28 coming into close contact with the valve body 20 has a concave round shape that corresponds to curvature of the external surface of the valve body 20, thus increasing a contact surface between the gasket 28 and the external surface of the valve body 20.

The gasket support 29 may be provided between the valve ring 27 and the gasket 28 such that one side of the gasket support comes into close contact with and cover one side of the gasket 28, supporting the gasket 28.

That is, since the external surface of the valve body 20 comes into close contact with and pushes the gasket 28 toward the valve ring 27, the valve ring 27 is resiliently compressed with the pressure by the valve body 20. Thus, elastic restoring force of the valve ring 27 is provided to the gasket 28, forming the surface-contact pressure between the gasket 28 and the contact surface of the valve body 20 and thus preventing the leakage of the cooling water flowing through respective ports.

Figure 9:
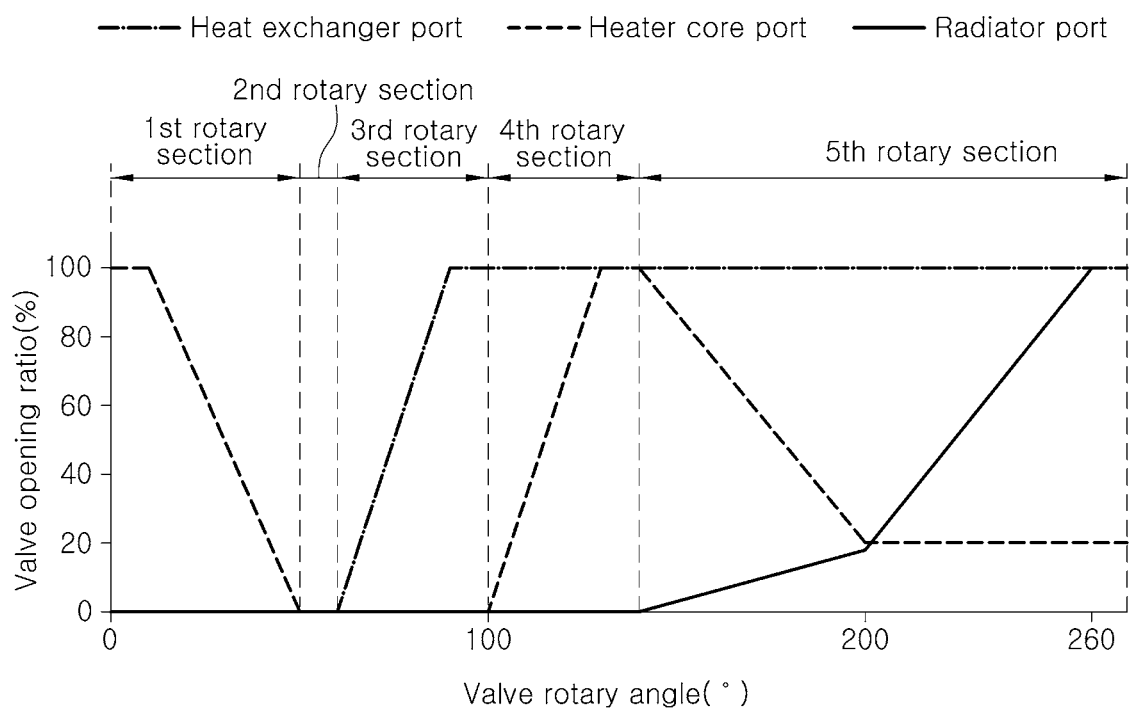
FIG. 9 is a diagram illustrating a valve opening state of the flow control valve according to a rotation angle of the valve body.

FIG. 9 is a diagram illustrating a valve opening state of the flow control valve 1 according to a rotation angle of the valve body, wherein an X-axis indicates a rotation angle of the valve (within a total rotation angle range) and a Y-axis indicates an opening ratio of respective ports.

Referring to FIG. 9, the flow control valve may be configured such that all of the radiator port 13, the heat exchanger port 14, and the heater core port 15 are closed in a second rotation section that corresponds to a middle rotation section of the total rotation section of the valve body 20.

For example, in a rotation section having a rotation angle of the valve body 20 ranging between 45 degrees and 60 degrees, the inlets of the radiator port 13, the heat exchanger port 14, and the heater core port 15 are closed by the valve body 20, and a small amount of cooling water is only introduced through the head port 12, rapidly elevating the temperature of an engine by minimizing a flow rate of the cooling water flowing out of the engine.

Furthermore, in a first rotation section of the valve body 20, only the heater core port 15 may be opened.

The heater core port 15 may be configured such that the heater core port is completely opened in portion of the first rotation section from a point of zero rotation angle, and the opening ratio of the heater core port 15 gradually decreases before the second rotation section.

For example, since the rotation section having a rotation angle of the valve body 20 ranging between zero and 45 degrees is a section that requires strong heating performance of a heater, it is configured such that the heater core port is opened and the radiator port 13 and the heat exchanger port 14 are closed so that the cooling water is collectively introduced into the heater core 45, securing strong heating performance of the heater.

Furthermore, the flow control valve may be configured such that, as the valve body further rotates from the second rotation section, the heat exchanger port 14, the heater core pump 15, and the radiator port 13 are sequentially opened.

That is, after the second rotation section that corresponds to a flow stop section of cooling water, the heat exchanger port 14 connected to a path on which an engine oil cooler, an ATF warmer, and the like are disposed is opened, then the heater core port 15 connected to a path on which the heater core 45 is disposed is opened, and finally the radiator port 13 connected to a path on which the radiator is disposed is opened, so that the oil temperature is elevated before reaching maximum cooling section of cooling water, improving fuel efficiency through improved friction performance.

Furthermore, the flow control valve may be configured such that in a third rotation section of the valve body 20 continuing from the second rotation section, only the heat exchanger port 14 is opened.

For example, in the third rotation section, the heater exchanger port 14 is opened and the radiator port 13 and the heater core port 15 are closed, so that the cooling water is collectively introduced into the oil heat exchanger 44, rapidly elevating the oil temperature.

The heat exchanger port 14 starts opening at a boundary between the second rotation section and the third rotation section and gradually increases the opening ratio to 100% before a boundary between the third rotation section and a fourth rotation section.

Furthermore, the flow control valve may be configured such that in the fourth rotation section of the valve body 20 continuing from the third rotation section, the heat exchanger port 14 and the heater core port 15 are opened.

For example, in the fourth rotation section, the heater exchanger port 14 and the heater core port 15 are opened and the radiator port 13 is closed.

The heater core port 15 starts opening at a boundary between the third rotation section and the fourth rotation section and gradually increases the opening ratio to 100% before a boundary between the fourth rotation section and a fifth rotation section. Here, in the fourth rotation section, the opening ratio of the heat exchanger port 14 is maintained at 100%.

Furthermore, the flow control valve may be configured such that in the fifth rotation section continuing from the fourth to a point of a maximum rotation angle, all of the heat exchanger port 14, the heater core port 15, and the radiator port 13 are opened.

For example, in the fifth rotation section, the heater exchanger port 14 and the heater core port 15, as well as the radiator port 13 are opened.

The radiator port 13 starts opening at a boundary between the fourth rotation section and the fifth rotation section and gradually increases the opening ratio to 100% before the point of the maximum rotation angle.

Furthermore, the flow control valve may be configured such that the opening ratio of the heater core port 15 starts decreasing at a boundary between the fourth rotation section and the fifth rotation section, and the opening ratio of the heat exchanger port 14 is maintained at 100% in the fifth rotation section.

As set forth in the foregoing, the flow control valve 1 of in various aspects of the present invention is configured such that the valve body 20 is rotatable with the driving power from the driving device 30 so that the opening ratio of respective ports varies in a response to a change in a rotation angle to control the opening ratios of the radiator port 13, the heat exchanger port 14, and the heater core port 15, properly controlling a flow of cooling water according to an operating condition of a vehicle.

That is, with a single operation of the flow control valve 1, the opening ratios of the three ports including the radiator port 13, the heat exchanger port 14, and the heater core port 15 are variably controlled.

Furthermore, various control stages are provided in the flow control valve according to an operating condition of a vehicle, and the operation is controlled through sequential control stages, having an effect of reducing operating distance and times of the flow control valve 1.

Furthermore, setting of the heating-first stage enables a flow rate toward the heater core 45 to be maximized, eliminating unnecessary flow loss of cooling water toward the oil heat exchanger 44 and maximizing the fuel efficiency and heating performance.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling circuit for a vehicle, the cooling circuit comprising:
    a plurality of cylinder heads into which cooling water is continuously introduced from a plurality of cylinder blocks oppositely disposed parallel with each other; and
    a flow control valve including:
        a head port fluidically-connected to the plurality of cylinder heads, wherein the cooling water discharged from the plurality of cylinder heads is joined in the head port and the joined cooling water is introduced into the flow control valve through the head port; and
        ports including a radiator port, a heat exchanger port, and a heater core port, through which the cooling water introduced into the flow control valve is discharged towards a radiator, an oil heat exchanger, and a heater core, respectively,
    wherein the cooling water stored in water jackets of the cylinder blocks is introduced into water jackets of the cylinder heads,
    wherein the water jackets of the cylinder heads have a channel at which the cooling water is joined, and
    wherein the cooling water discharged from each of the plurality of cylinder heads is joined together directly at a front side of the head port of the flow control valve and the joined cooling water is introduced into the head port.

2. The cooling circuit for the vehicle according to claim 1, wherein an exhaust gas recirculation (EGR) cooling path is connected to an exhaust gas recirculation (EGR) cooler through water jackets of the cylinder block to allow a portion of cooling water in the cylinder block to be continuously introduced into the exhaust gas recirculation (EGR) cooler through the exhaust gas recirculation (EGR) cooling path.

* * * * *